US008657319B1

(12) United States Patent
Cullen et al.

(10) Patent No.: US 8,657,319 B1
(45) Date of Patent: Feb. 25, 2014

(54) SELECTIVE TORQUE APPLICATION DEVICE

(76) Inventors: Geoffrey Cullen, Greenwich, CT (US); Carlton Forse, Enfield, CT (US); Ryan Gresh, Ellington, CT (US)

( * ) Notice: Subject to any disclaimer, the term of this patent is extended or adjusted under 35 U.S.C. 154(b) by 158 days.

(21) Appl. No.: 13/091,378

(22) Filed: Apr. 21, 2011

Related U.S. Application Data

(60) Provisional application No. 61/327,475, filed on Apr. 23, 2010.

(51) Int. Cl.
*B62M 1/14* (2006.01)

(52) U.S. Cl.
USPC ........ 280/250.1; 280/252; 280/253; 280/255; 280/256; 180/6.32; 180/6.34; 180/6.38; 74/25; 74/136; 74/167

(58) Field of Classification Search
USPC ...................... 280/250.1, 252, 253, 255, 256; 180/6.32, 6.34, 6.38; 74/25, 136, 167
See application file for complete search history.

(56) References Cited

U.S. PATENT DOCUMENTS 3,901,527 A * 8/1975 Danziger et al. .............. 280/638
4,079,657 A 3/1978 Sobreira
4,506,900 A 3/1985 Korosue
5,743,544 A * 4/1998 Weaver ......................... 280/249
6,247,715 B1 6/2001 Korosue
6,755,430 B1 6/2004 Watwood et al.
6,889,991 B1 5/2005 Facer et al.
7,192,043 B1 3/2007 McLuen
7,341,267 B2 3/2008 Vroom
8,136,613 B2 * 3/2012 Schaedler et al. ........... 180/6.24
8,152,188 B2 * 4/2012 Kylstra ...................... 280/250.1
8,235,407 B2 * 8/2012 Cerreto et al. ............. 280/250.1

* cited by examiner

*Primary Examiner* — Tashiana Adams
*Assistant Examiner* — Marlon Arce
(74) *Attorney, Agent, or Firm* — UConn IP Law Clinic; Susan K. Pocchiari; Aaron Van Stralen

(57) ABSTRACT

The present invention is a device which can be used to provide rotation motion to a driving wheel by the application of lateral motion by the user. It consists of axial track plate having a plurality of track paths with said guide paths having a plurality of slope sections. Additionally the caliper element can enable movement of a wheelchair's wheel from a first position to a second position. The caliper element is responsive to slope sections such that the slope sections can engage or disengage the caliper element. The caliper element's broad face is parallel to the track plate's broad face. The broad face is perpendicularly connected to each other via cylindrical pegs along the guide paths. The caliper element has a mating surface enabled to rotate a sprocket which is concentrically connected to a wheel hub where wheel rotates at the same angular velocity as the sprocket while the sprocket is in the engaged mode. A locking arm component disposed between the caliper element and the track guide paths for locking the system into place so that no further movement is made possible.

18 Claims, 4 Drawing Sheets

10

SELECTIVE TORQUE APPLICATION DEVICE

CROSS-REFERENCE TO RELATED APPLICATION

This application claims priority from U.S. Provisional application No. 61/327,475 filed Apr. 23, 2010 and incorporates that application by reference in its entirety.

FIELD OF THE INVENTION

The present invention relates generally to a mechanism for transferring torque and more particularly to a torque driven mechanism having a safety lock.

BACKGROUND OF THE INVENTION

Many devices with wheels and other motion propelled systems necessitate the use of locking mechanism to ensure safety of operation. The locking mechanism becomes even a more critical part of the system when nature of the activity promoted by the system can cause severe physical harm, or alternatively when user of the system is somehow impaired (minor, disabled etc.). Unfortunately, the locking mechanisms currently being used in the prior art do not always offer a safe or easy to use solution, For example, many of the commercial wheelchair designs have great shortcomings in this area. In order to understand the scope of this problem, it is useful to examine a typical wheelchair design in more detail.

It should first be noted that most wheelchairs and other such similar systems, often require the use of propulsion of a main driving wheel by the use of lateral actuation of a handle. The typical wheelchair has two large diameter wheels mounted toward the back, with two small diameter swivel wheels located in the front. The operator propels the wheelchair by grabbing a push rim mounted to the large diameter wheels and forcing the push rim forward, backward, or each side at different rates in order to turn. Wheelchairs work best on smooth, flat surfaces. However, the wheelchair operator cannot be limited to traversing ideal terrain in all situations. When the operator encounters a single obstacle, they can shift their weight appropriately to lighten the weight on the given wheel(s) and also exert a greater force on the push rims. The problem arises when the wheelchair operator traverses bumpy, uneven terrain typical of many off-road situations. On unpaved undulating terrain, each wheel may experience a dip or mound that the operator cannot easily overcome simply be transferring their weight. Currently, the operator of a typical wheelchair as exists in the prior art limited to amount of force they can generate and apply directly to the push rim.

Consequently, there is a need for an improved mechanism where the operator could apply a force to the wheels using a greater lever arm and could more easily traverse uneven terrain.

SUMMARY OF THE INVENTION

The shortcomings of the prior art are overcome and additional advantages are provided through the provision of a method, a device, and system for causing propulsion of a wheel. Said method, device, and system comprising axial plates having a plurality of track paths; the track paths can include a plurality of slope sections. The caliper element can enable movement of a wheel from a first position to a second position or cause and prevent its rotation by engaging it through the sloped sections. The caliper element includes a broad face that can be parallel to the track plate. The broad face and the track plate can be perpendicularly connected to each other via pegs along the track paths. The caliper element in one embodiment also comprises a mating surface enabled to rotate a sprocket which is concentrically connected to a wheel hub such that when the wheel rotates at the same angular velocity as the sprocket the sprocket remains in the engaged mode.

BRIEF DESCRIPTION OF THE FIGURES

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION OF THE INVENTION

Figure 1:
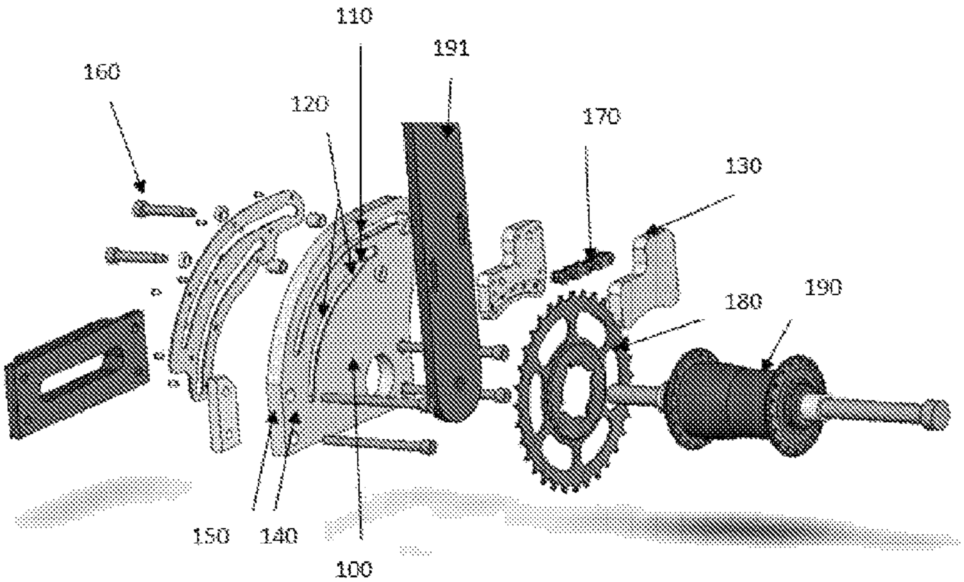
FIG. 1 is an illustration of an exploded view of one embodiment of the present invention.

FIG. 1 is an illustration of one embodiment of the present invention. In FIG. 1, an exploded view of a self-propelling system (10) is provided as shown. For ease of understanding, the self-propelling system (10) (hereinafter system) will be discussed in conjunction with the use in a wheelchair. However, those skilled in the art can appreciate that the use of the system is in not limited to that of wheelchairs and the teachings of the present invention can be applied to many other devices. For example, in alternate embodiments, the present system can also be easily used in strollers, carts, bicycles and tricycles, in vehicles and devices used in the delivery of packages, or in a variety of other similar applications.

Referring back to FIG. 1, the system (10), in the embodiment shown, comprises an axial track plate (100) having a plurality of track paths (110) that can be sloped or substantially sloped, as referenced by slope sections (120). A caliper element (130) is also provided that is responsive to slope sections (120) such that the slope sections (120) can engage or disengage the caliper element (130) with a sprocket (180) as shown. This is accomplished by the actuation of one or more locking component(s) (191) progressing through its motion manipulating the position of one or more pegs (preferably cylindrical pegs) (160) or other similar components along the track paths (110), which in turn manipulate the caliper element (130) in a radial direction with respect to a wheel hub (190) in order to engage or disengage with the sprocket (180). In this way, the caliper element (130) enables movement of a (wheelchair's) wheel from a first position to a second position through circumferential motion with respect to the wheel hub (190). In one embodiment, the caliper element (130) has broad faces (140) and a plurality of edge segments (150), where the broad faces (140) are aligned and opposing one other and parallel to the track plate broad faces (101). In a preferred embodiment, these faces are obliquely connected to one another via a plurality of pegs (160) disposed along the track paths. In other embodiments, other connectors can be used in place of pegs as appreciated by those skilled in the art.

The caliper element (130) has a mating surface (170) enabled to rotate a sprocket (180). In one embodiment, the sprocket (180) is concentrically connected to a wheel hub (190) where wheel rotates at the same angular velocity as the sprocket (180) while the sprocket is in the engaged mode. However, alternative embodiments can be provided as appreciated by those skilled in the art with different designs. For example, one embodiment can have a gear system so that the sprocket (180) is located radially outwards from the wheel hub (190) are not concentric. In the preferred embodiment, a locking arm component (191) disposed between the caliper element (130) and the track plate (100) for rotating the caliper element (130) provides wheel rotation. In one embodiment, the locking arm component (191) locks said system into place so that no further movement is made possible.

Figure 2:
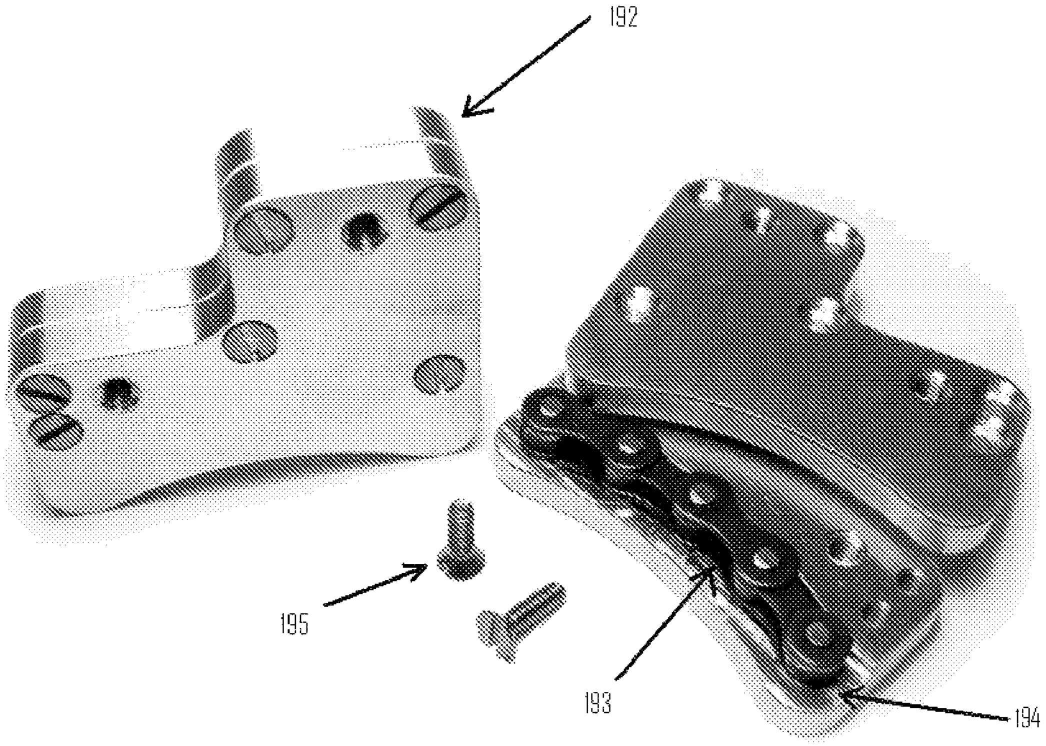
FIG. 2 is an illustration of the caliper element as per embodiment of FIG. 1, shown both as assembled and an unassembled views.

FIG. 2 is an illustration of the caliper element as discussed in conjunction with FIG. 1. As shown, FIG. 2, provides both assembled and unassembled views of the caliper element (130). In the embodiment shown, the caliper element (130) is constructed of two sides of a rigid fixture (192) which constrain a small section of common roller chain (193). A guide path (194) is constructed by creating a recess in the interior of the two sides of the rigid fixture (192). The guide path (194) is shaped to constrain the roller chain (193) in a semi-circular shape consistent with the sprocket (180). The two halves are then assembled with a fastening means, such as machine screws (195). However, as can be appreciated by those skilled in the arts, other manners of assembly and fastening is possible in alternate embodiments including but not limited to adhesion, fusing or simply fabricating the caliper element as a single integral unit.

In an alternative embodiment, the Caliper Element (130) can be constructed of roller elements integral to the Rigid Fixture (192). The roller elements would be similar to those used in commonly available roller chain. The roller elements would be constructed by machining directly into the Rigid Fixture (192). The position of the roller elements could then be rigidly placed substantially in the shape of an arc. Other configurations of the Caliper Element (130) could be constructed by those skilled in the arts which would actuate the sprocket.

Figure 3:
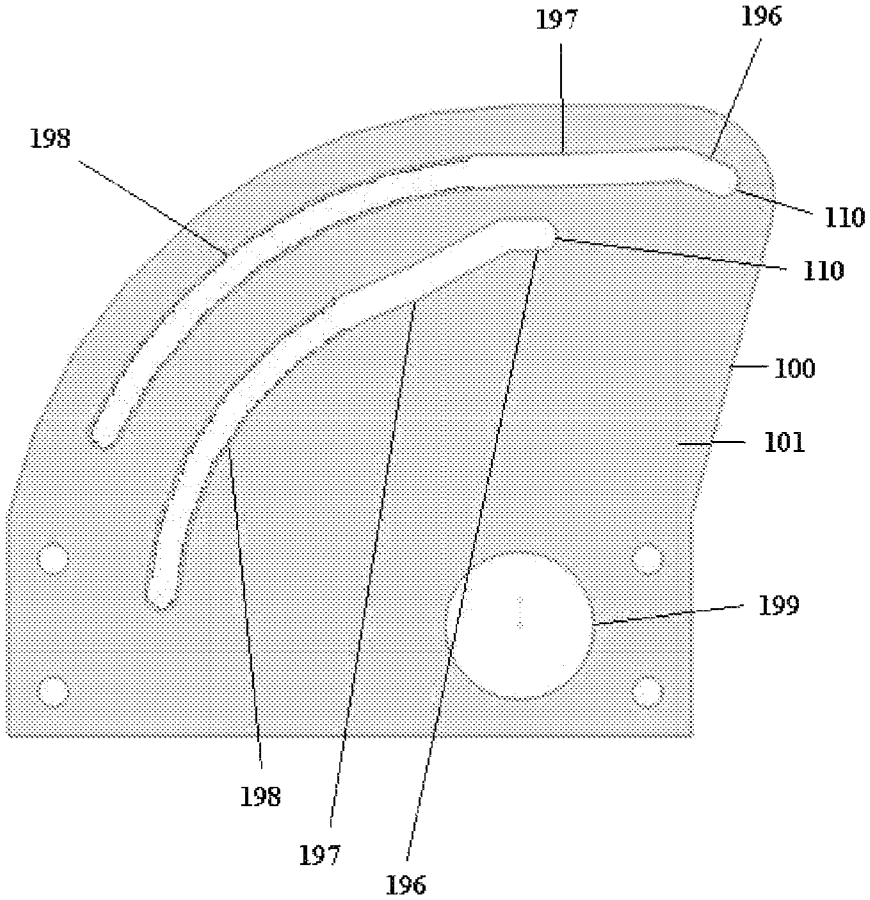
FIG. 3 is side view an illustration of the track plate as per embodiment of FIG. 1.
Figure 4:
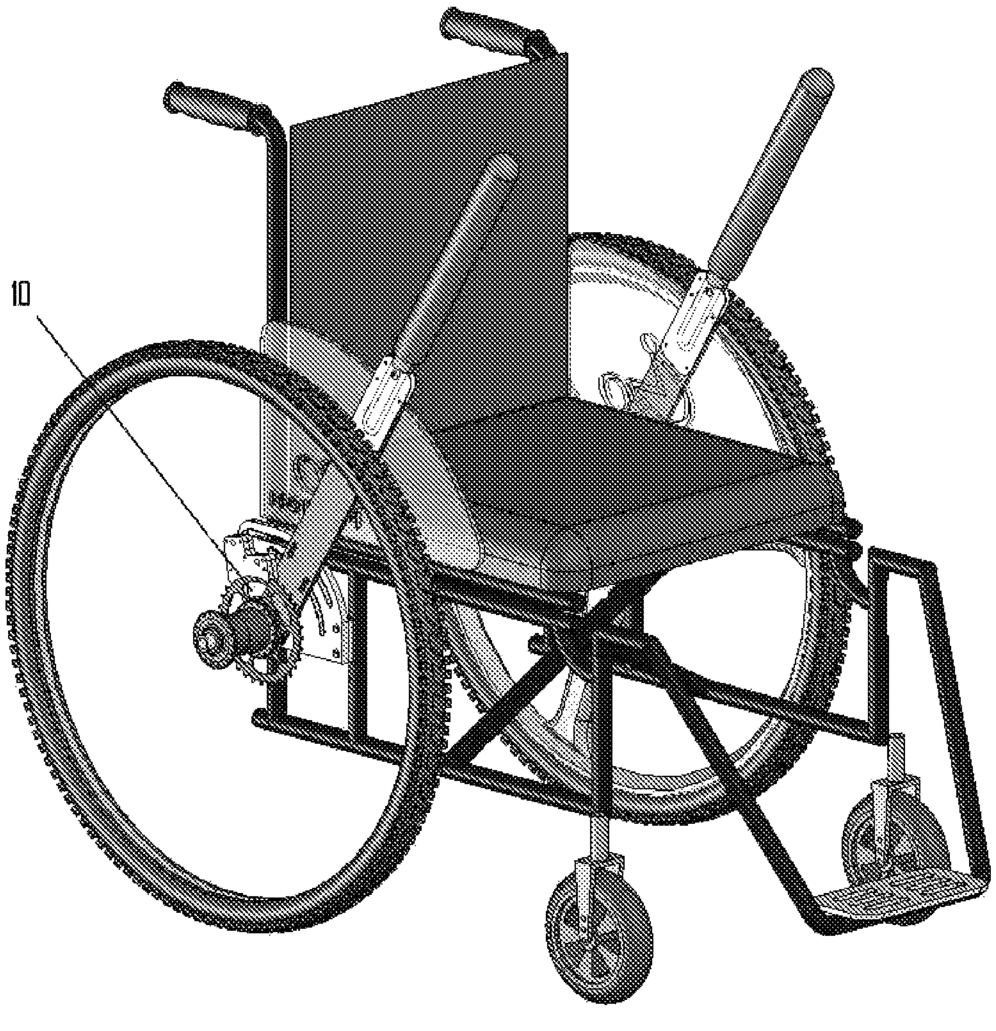
FIG. 4 is an illustration of one embodiment of the self-propelling system (10) of the present invention as used in conjunction with a wheelchair.

FIG. 3 is an illustration of one embodiment of the Axial Track Plate (100) as discussed in conjunction with FIG. 1. In this embodiment, the Track Paths (110) are situated substantially perpendicular to Track Plate Broad Face (101). The center of the hub, in one embodiment comprises a Hub Hole (199) which can be selectively symmetrical with the axis of rotation of the Wheel Hub (190). In one embodiment, a plurality of Track Paths (110) can be provided having one or more sections. In this example, two Track Paths (110) are provided consisting of three different sections.

To further aid understanding, the engagement and disengagement of the Caliper Element (130) will be discussed in reference with one or more sections that make such engagement and disengagement possible and are hence aptly named as will be presently provided. The Disengaged Section (196) is situated in a radial distance from the center of the Hub Hole (199) so that the Caliper Element (130) is not in contact with the Sprocket (180). Furthermore, a Transition Section (from engagement to disengagement) (197) can also be viewed. In the Transition Section (197), the Caliper Element (130) is moved in a radial direction toward the Hub Hole (199) until the Caliper Element (130) intersects the Sprocket (180) in a smooth and non-binding manner. The Engaged Section (198) secures the Caliper Element (130) substantially radially at a fixed distance from the Hub Hole (199) in which the distance allows meshing of the thrust transferring components of the Caliper Element (130) and Sprocket (180).

In one embodiment wherein the Caliper Element (130) can be constructed of a roller chain or other such material as can be appreciated by those skilled in the art. In that case, the Transition Section (197) is so configured to allow the rollers of the Roller Chain (193) to intersect the teeth of the Sprocket (180) tangentially normal to the point of contact to avoid binding the mechanism. Hence, in this embodiment, when a user moves the Locking Arm Component (191) forward, the Locking Arm Component (191) moves the Caliper Element (130). The Caliper Element (130) is then guided by the (Cylindrical) Pegs (160) which are limited in their motion by the Track Paths (110). As a result, in such an embodiment, the user manipulates the Locking Arm Component (191) which induces a circumferential motion in the Caliper Element (130) while the (Cylindrical) Pegs (160) induce a radial motion. When the user reverses the movement of the Locking Arm Component (191), the process is reversed.

In another embodiment, the apparatus shown can be used as part of a movement generation mechanism used in conjunction with a mechanical wheelchair. In an alternate embodiment, the mechanism can be used for other applications as appreciated by those skilled in the art.

Furthermore, it is self evident that the teachings of the present invention as presently discussed also incorporate associated methodology for use, assembly, and appropriate fabrication. While the invention has been described in accordance with certain preferred embodiments thereof, those skilled in the art will understand the many modifications and enhancements which can be made thereto without departing from the true scope and spirit of the invention, which is limited only by the claims appended below.

What is claimed is:

1. A propulsion system comprising
- an axial track plate having a plurality of track paths;
- said track paths having a plurality of slope sections;
- a caliper element to enable movement of a wheel from a first position to a second position;
- said caliper element being responsive to slope sections such that said slope sections can engage or disengage said caliper element with a circular member enabling said wheel to rotate;
- said caliper and track plate each having a broad face;
- said caliper element's broad face being parallel to said track plate's broad face;
- said face being perpendicularly connected to each other via a plurality of pegs disposed along said track paths;
- said caliper element disposed such that it moves in a substantially concentric path with respect to the center of said wheel,
- said caliper element having a mating surface enabled to engage with a circular member and rotate it;
- said circular member being connected to a wheel hub such that it enables said wheel to rotate while said circular member is engaged.

2. The device in claim 1, where the caliper element comprises a roller chain of a particular length and said circular member comprises a matching sprocket.

3. The device of claim 1, wherein said caliper element further comprises a plurality of fixtures and a means for fastening said fixtures to one another.

4. The device of claim 2, wherein said fixtures each comprise a plurality of sides which contains a substantially arc shaped recess on an interior of one of said fixture sides to complementarily house said chain and at least another side is substantially flat to encompass said chain completely in between said recessed and said flat sides.

5. The device in claim 3, wherein said caliper element further comprises a plurality of links of roller chain held in a substantially rigid arc shape such that it can interface with a sprocket.

6. The device of claim 1, wherein said pegs further are cylindrical.

7. The device of claim 1, further comprising a locking arm component disposed between said caliper element and said track plate so any further movement of said wheel is prevented.

8. The device in claim 7, wherein a lever arm is used to enable movement of said caliper element while in said engaged mode, said lever arm acting to prevent further movement when in said disengaged mode.

9. The device in claim 7, wherein said locking arm folds into an armrest; said arm further enabled to allow a user to manipulate said caliper element by exerting force via said tracks to engage, disengage or transitional positions such that a locked or unlocked state can be achieved.

10. The device of claim 1, wherein said circular member is connected to a wheel hub having a transmission system.

11. The device of claim 1, wherein said caliper element comprises at least a portion of a gear and said circular member further comprises a matching gear.

12. The device in claim 1, wherein said circular member is attached to a shaft.

13. The device in claim 1, wherein said device is attached to a wheelchair.

14. The device of claim 1, wherein said track plate have a plurality of parallel tracks further comprising a plurality of sections.

15. The device of claim 14, wherein said parallel tracks comprise three sections.

16. The device of claim 14, wherein said track plate further comprises a disengaged section in which the radial distance from the hub is such that the caliper element is not contacting the sprocket.

17. The device of claim 16, wherein said track plate further comprises a transition section in which a radial distance from said hub brings said caliper element progressively closer to said sprocket.

18. The device of claim 14, wherein said track plate further comprises an engaged section in which said radial distance from said hub of said caliper element is such that any torque imparted by said caliper element is transmitted to said hub.

* * * * *